(12) United States Patent
Takahashi

(10) Patent No.: US 8,977,868 B2
(45) Date of Patent: Mar. 10, 2015

(54) FLEXIBLE PRINTED CABLE AND INFORMATION PROCESSING DEVICE

(75) Inventor: Nubuo Takahashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 14/127,821

(22) PCT Filed: Mar. 16, 2012

(86) PCT No.: PCT/JP2012/057654
§ 371 (c)(1),
(2), (4) Date: Dec. 19, 2013

(87) PCT Pub. No.: WO2013/005460
PCT Pub. Date: Jan. 10, 2013

(65) Prior Publication Data
US 2014/0123327 A1 May 1, 2014

(30) Foreign Application Priority Data
Jul. 7, 2011 (JP) .................................. 2011-150622

(51) Int. Cl.
| | |
|---|---|
| G06F 21/00 | (2013.01) |
| G06F 21/82 | (2013.01) |
| H05K 1/02 | (2006.01) |
| G01R 19/00 | (2006.01) |
| H05K 1/11 | (2006.01) |

(52) U.S. Cl.
CPC .............. *G06F 21/82* (2013.01); *H05K 1/0275* (2013.01); *G01R 19/00* (2013.01); *H05K 1/0268* (2013.01); *H05K 1/0298* (2013.01); *H05K 1/118* (2013.01); *H05K 2201/09236* (2013.01)
USPC .............................. 713/194; 713/193; 726/34

(58) Field of Classification Search
CPC ......... G06F 21/86; G06F 21/72; G06F 21/14; G06F 21/75; G06F 21/76
See application file for complete search history.

(56) References Cited

U.S. PATENT DOCUMENTS

| | | |
|---|---|---|
| 5,204,512 A | 4/1993 | Ieki et al. |
| 6,496,119 B1 | 12/2002 | Otterstedt et al. |

(Continued)

FOREIGN PATENT DOCUMENTS

| | | |
|---|---|---|
| JP | 01-258309 A | 10/1989 |
| JP | 01-287999 A | 11/1989 |
| JP | 03-144823 A | 6/1991 |

(Continued)

OTHER PUBLICATIONS

International Search Report, PCT/JP2012/057654, dated May 1, 2012.

(Continued)

*Primary Examiner* — Izunna Okeke
(74) *Attorney, Agent, or Firm* — Sughrue Mion, PLLC

(57) ABSTRACT

It is an object of this invention to provide an FPC capable of improving tamper resistance. An FPC (1) of this invention includes: a signal line pattern (2) for inputting a communication signal; and signal protective line patterns (3, 4) provided to be opposed to an upper surface and a lower surface of the signal line pattern and having the same width as a width of the signal line pattern (2) or a larger width than the width of the signal line pattern (2). The signal protective line patterns are provided along the signal line pattern within a region that requires tamper resistance.

10 Claims, 6 Drawing Sheets

(56) References Cited

U.S. PATENT DOCUMENTS

2004/0117693 A1 6/2004 Moriyama et al.
2010/0273539 A1* 10/2010 Lee et al. .................. 455/575.3

FOREIGN PATENT DOCUMENTS

| JP | 05-047766 A | 2/1993 |
| JP | 10-188684 A | 7/1998 |
| JP | 2002-210179 A | 7/2002 |
| JP | 2002-529928 A | 9/2002 |
| JP | 2003-296680 A | 10/2003 |
| JP | 2006-303480 A | 11/2006 |
| JP | 2007-281145 A | 10/2007 |
| JP | 2009-087988 A | 4/2009 |
| WO | WO 2007019642 A1 * | 2/2007 |

OTHER PUBLICATIONS

Japanese Office Action from Japanese Patent Application No. 2011-150622.

* cited by examiner

FLEXIBLE PRINTED CABLE AND INFORMATION PROCESSING DEVICE

CROSS REFERENCE TO RELATED APPLICATIONS

This application is a National Stage of International Application No. PCT/JP2012/057654 filed Mar. 16, 2012, claiming priority based on Japanese Patent Application No. 2011-150622 filed Jul. 7, 2011, the contents of all of which are incorporated herein by reference in their entirety.

TECHNICAL FIELD

This invention relates to a flexible printed cable and an information processing device including the flexible printed cable.

BACKGROUND ART

In recent years, acts of making illegal connection called "tampering" to a component for transmitting/receiving a communication signal, such as a circuit board, an IC chip, or a connector or a cable connecting boards, and illegally reading out the communication signal thereby have been considered as a problem. The structure for preventing the tampering is therefore sought after.

Particularly in information processing devices for directly handling personal information, in particular, information on money or property, such as a credit card payment terminal and an ATM, high-level security is required to prevent the information from being stolen or illegally used by tampering.

Known structures for preventing the tampering include a structure in which a component that can be subjected to tampering is covered to make it difficult to make external illegal connection and a structure in which the device itself is broken when a component is detached for attempting illegal connection (Patent Literature 1).

Although not aimed at preventing tampering, the following structure is also known. In order to prevent wiring in a cable from contacting with an external conductor to be short-circuited, the periphery of the wiring is covered by a cylindrical conductor layer applied with a predetermined voltage, and, when the external conductor comes into contact with the conductor layer to change the voltage, this change is regarded as a sign of short-circuit and a warning is issued (Patent Literature 2).

CITATION LIST

Patent Literature

Patent Literature 1: Japanese Unexamined Patent Application Publication (JP-A) No. 2002-210179
Patent Literature 2: Japanese Unexamined Patent Application Publication (JP-A) No. Hei 10-188684

DISCLOSURE OF THE INVENTION

Problems to be Solved by the Invention

The structure as disclosed in Patent Literature 1, however, is not aimed at improving the tamper resistance of the component itself, and further has a problem in that the cost of the device as a whole becomes larger and the device itself becomes heavier as the tamper resistance is enhanced.

In the structure as exemplified by a flexible printed cable (hereinafter abbreviated to "FPC") in which communication signal lines are arranged in a line and flat, it is difficult to apply the member for covering the entire wiring as disclosed in Patent Literature 1 or the structure comprising the cylindrical conductor layer for covering the entire wiring as disclosed in Patent Literature 2. Besides, in such a structure, there is a fear that the structural characteristics of the FPC, such as being thin and flexible, may be impaired.

It is therefore difficult at present for the FPC to prevent illegal connection, and there is only a method to house the entire cable in a tightly-protected section or to avoid the use of the cable itself.

In another case where it is forced to apply the FPC onto a location at which tight protection is difficult to secure and transmit an important communication signal therethrough in terms of device configuration, it is necessary to give up providing high-level security or provide another protective means outside the FPC although the cost increases.

This invention has been made in view of the above-mentioned problems, and it is an object thereof to provide an FPC capable of improving tamper resistance.

Means to Solve the Problem

In order to achieve the above-mentioned object, a flexible printed cable according to a first aspect of this invention includes: a signal line pattern for inputting a communication signal; and signal protective line patterns provided to be opposed to an upper surface and a lower surface of the signal line pattern and having the same width as a width of the signal line pattern or a larger width than the width of the signal line pattern, in which the signal protective line patterns are provided along the signal line pattern within a region that requires tamper resistance.

An information processing device according to a second aspect of this invention includes: the flexible printed cable according to the first aspect; and a control unit including: a detection section for detecting a change in potential of the signal protective line patterns; and an illegal connection information generation section connected to the detection section, for generating illegal connection information for notifying that illegal connection has been made when the detection section detects the change in the potential.

A flexible printed cable according to a third aspect of this invention includes: a signal line pattern for inputting a communication signal; and a signal protective line pattern provided to be opposed to only any one of an upper surface and a lower surface of the signal line pattern and having the same width as a width of the signal line pattern or a larger width than the width of the signal line pattern, in which the signal protective line pattern is provided along the signal line pattern within a region that requires tamper resistance.

Effect of the Invention

According to this invention, the FPC capable of improving tamper resistance can be provided.

BRIEF DESCRIPTION OF THE DRAWING

FIG. 8 is a block diagram illustrating a hardware configuration of a unit using a FPC 1a.

MODE FOR EMBODYING THE INVENTION

Figure 1:
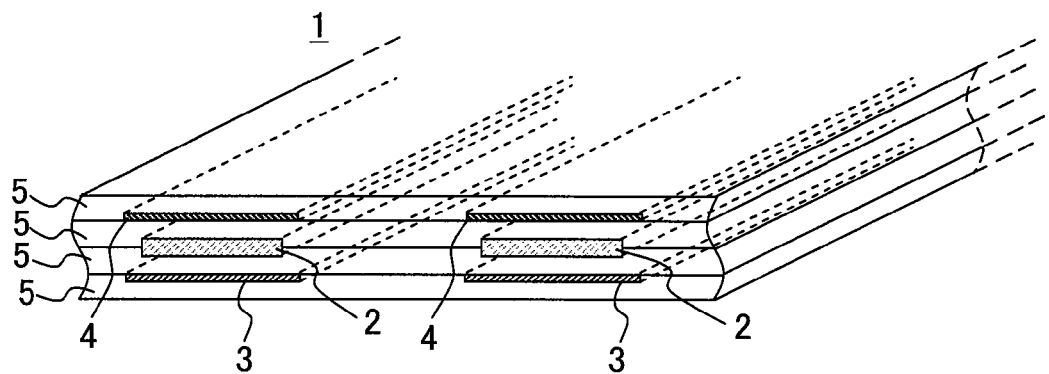
FIG. 1 is a cross-sectional perspective view illustrating an FPC 1.

Referring to the drawings, exemplary embodiments of this invention are described in detail below.

First referring to FIGS. 1 to 3, a schematic configuration of an FPC 1 according to a first embodiment of this invention is described below.

Figure 2:
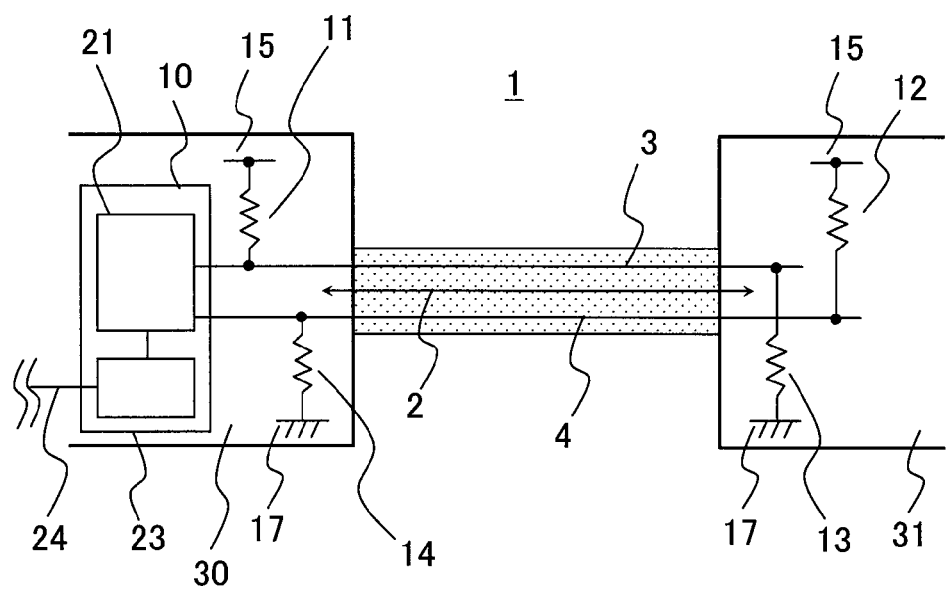
FIG. 2 is a block diagram illustrating a hardware configuration of a unit using the FPC 1.
Figure 3:
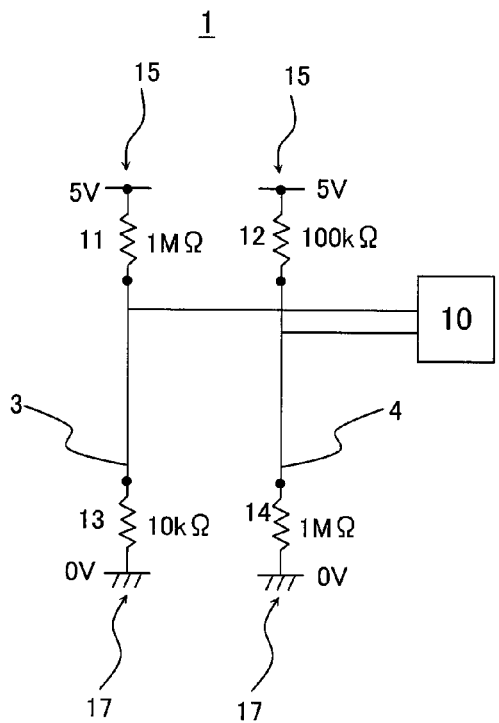
FIG. 3 is a wiring diagram of the unit using the FPC 1, omitting a signal line pattern 2.

As illustrated in FIGS. 1 to 3, the FPC 1 includes a signal line pattern 2, signal protective line patterns 3 and 4, and an FPC control unit 10. The signal line pattern 2 inputs a communication signal such as a bus signal or a data signal. The signal protective line patterns 3 and 4 are provided to be opposed to the signal line pattern 2 and have the same width as that of the signal line pattern 2 or a larger width than that of the signal line pattern 2. The FPC control unit 10 is an electronic circuit connected to the signal protective line patterns 3 and 4, for detecting a change in potential of the signal protective line patterns 3 and 4 to monitor illegal connection.

Referring to FIGS. 1 to 6, the structure of the FPC 1 is described in more detail below.

As illustrated in FIG. 1, the signal line pattern 2 and the signal protective line patterns 3 and 4 are covered by insulating layers 5 and are separated from one another to be electrically insulated.

Figure 4:
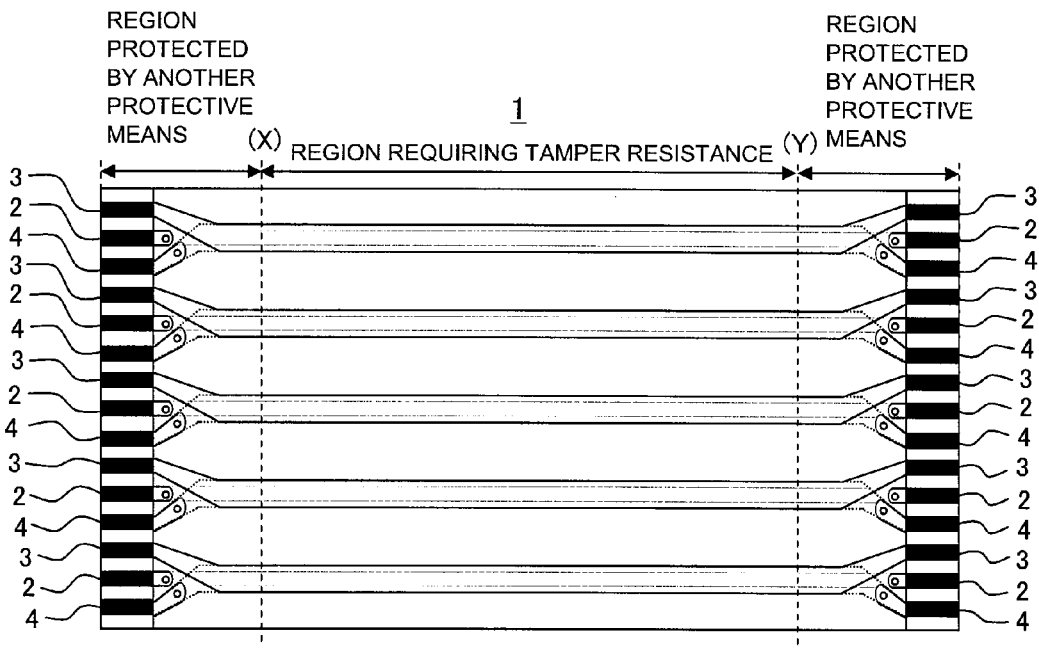
FIG. 4 is a plan view of the FPC 1.
Figure 5:
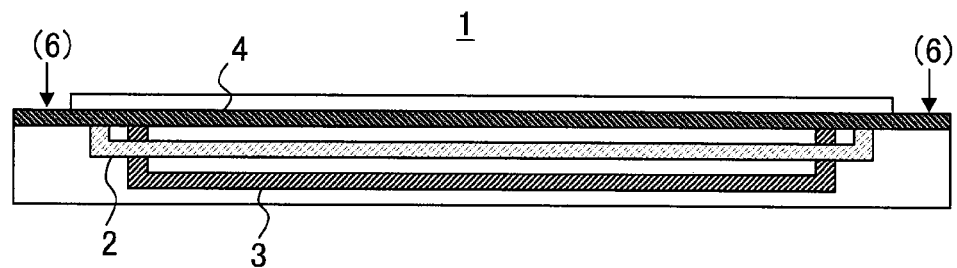
FIG. 5 is a cross-sectional view of FIG. 4 in a wiring direction.
Figure 6:
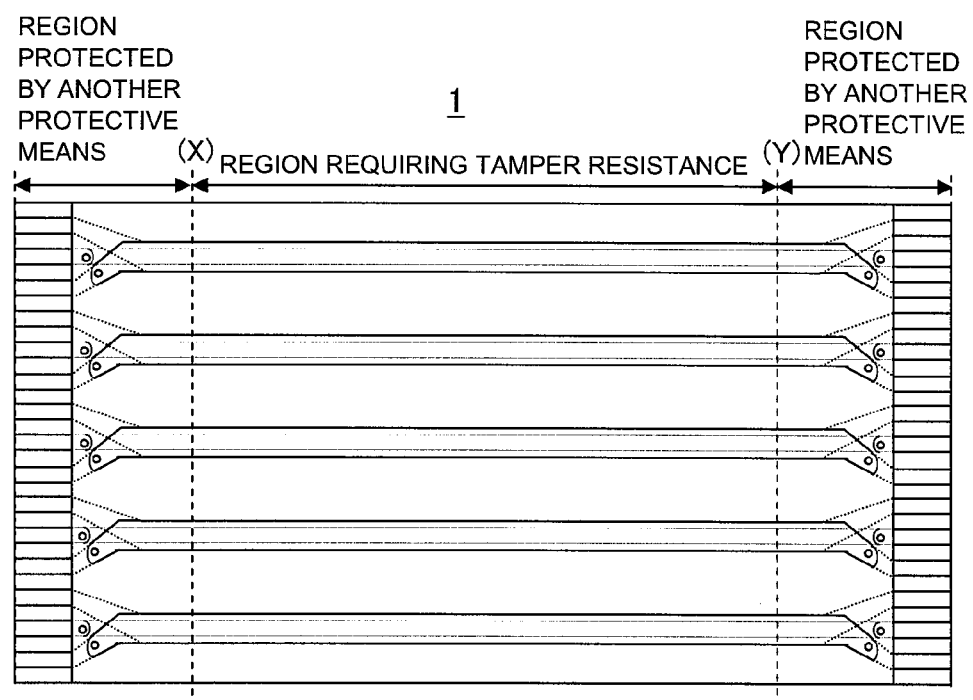
FIG. 6 is a rear view of FIG. 4.

As illustrated in FIGS. 4 to 6, both ends of the signal protective line patterns 3 and 4 are offset to both sides in the width direction with respect to the signal line pattern 2, and hence connector terminals 6 are arranged in a line. In the FPC 1, in a region that requires tamper resistance (region between dotted line X and dotted line Y of FIG. 4), the signal protective line patterns 3 and 4 having a larger width than that of the signal line pattern 2 are provided on upper and lower sides thereof along the signal line pattern 2. The signal protective line patterns 3 and 4 may have the same width as that of the signal line pattern 2. Regions other than the region that requires tamper resistance are protected by another protective means such as covering by a casing of a unit having tamper resistance.

The signal line pattern 2, the signal protective line pattern 3, the signal protective line pattern 4, and the insulating layer 5 are arbitrarily variable in width, length, thickness, material, and the like. For example, the signal line pattern 2 and the signal protective line patterns 3 and 4 are formed of copper, aluminum, silver, iron, or another metal, a carbon-based conductive material, or the like, and the insulating layer 5 is formed of an insulating material such as polyester, polyimide, polyethylene, or polyamide. Thus, a commonly-used multi-layered FPC structure can be applied as it is.

FIG. 2 illustrates an example where the FPC 1 is used to connect a first unit 30 and a second unit 31 to each other in an information processing device.

As illustrated in FIG. 2 and FIG. 3, one end portion of each of the signal protective line patterns 3 and 4 is connected to a power source 15 for applying a constant voltage (5 V in FIG. 3) via a resistor, and the other end portion thereof is connected to a ground section 17 for grounding via a resistor and is connected also to the FPC control unit 10.

The signal protective line patterns 3 and 4 are connected to the power source 15 via a first power source side resistive element 11 and a second power source side resistive element 12, respectively, and are connected also to the ground section 17 via a first ground side resistive element 13 and a second ground side resistive element 14, respectively.

In FIG. 3, the application voltage of the power source 15 is 5 V, and the first power source side resistive element 11 has an electrical resistance value of 1 MΩ, which is larger than that of the first ground side resistive element 13, whereas the first ground side resistive element 13 has an electrical resistance value of 10 kΩ, which is sufficiently smaller than that of the first power source side resistive element 11. Those electrical resistance values are set so that the potential of the signal protective line pattern 3 (between the first power source side resistive element 11 and the first ground side resistive element 13) may be close to the potential of the ground section 17, that is, close to 0 V.

On the other hand, the second power source side resistive element 12 has an electrical resistance value of 100 kΩ, whereas the second ground side resistive element 14 has an electrical resistance value of 1 MΩ, which is sufficiently larger than that of the second power source side resistive element 12. Those electrical resistance values are set so that the potential of the signal protective line pattern 4 (between the second power source side resistive element 12 and the second ground side resistive element 14) may be close to the potential of the power source 15, in this case, close to 5 V.

Note that, the signal line pattern 2 inputs a communication signal to be used for communication between boards, units, or the like connected to the FPC 1, and the voltage of the power source 15 and the resistance values of the respective resistive elements are set so that the potentials of the signal protective line patterns 3 and 4 may be different from the potential of the communication signal.

The FPC control unit 10 includes a detection section 21 connected to the signal protective line patterns 3 and 4, and an illegal connection information generation section 23 connected to the detection section 21. The detection section 21 detects a change in potential of the signal protective line patterns 3 and 4. When the detection section 21 detects the change in potential, the illegal connection information generation section 23 generates and transmits illegal connection information for notifying that illegal connection has been made to a control unit of the information processing device that uses the FPC 1. The illegal connection information generation section 23 is connected to the control unit of the information processing device that uses the FPC 1 via a communication line 24.

The control unit of the information processing device that has received the illegal connection information performs processing of stopping the operation of, for example, the boards or the units described above or processing of erasing important information (information that may possibly be stolen by illegal connection) owned by the device. When illegal connection is made, the communication signal can be prevented from being illegally read out by performing those kinds of processing. Note that, the two kinds of the above-mentioned processing may be performed or only one processing may be performed.

Next, the operations of the FPC 1 and the FPC control unit 10 are described below.

First, when no illegal connection is made, a communication signal having a predetermined potential is input to the signal line pattern 2, and the signal protective line patterns 3 and 4 are applied with the voltage from the power source 15 so that the signal protective line pattern 3 is held at a potential close to the potential of the ground section 17 and the signal protective line pattern 4 is held at a potential close to the potential of the power source 15.

Figure 7:
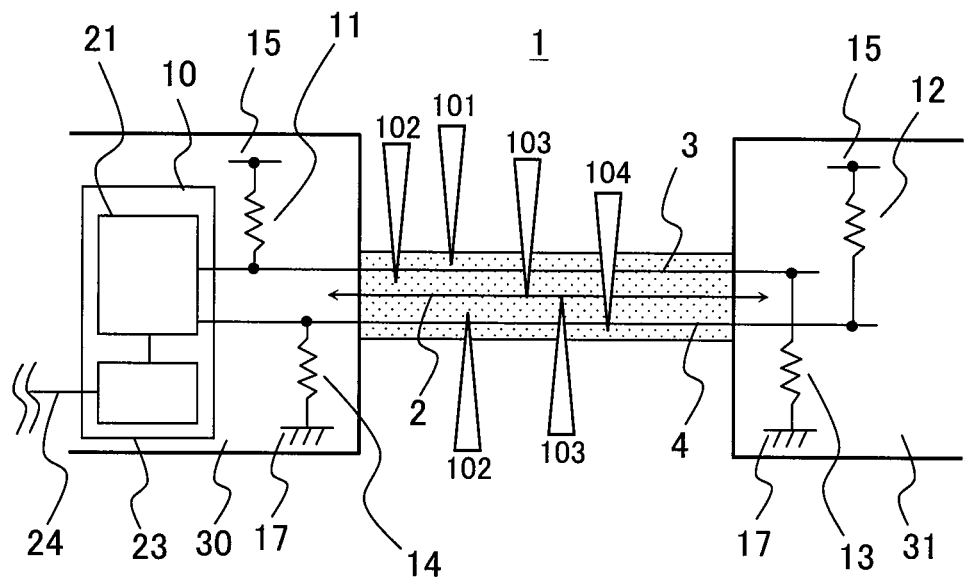
FIG. 7 is a diagram illustrating a state in which illegal connection is attempted to the FPC 1.

Now it is assumed as illustrated in FIG. 7 that any person attempts to make illegal connection to the signal line pattern 2 from the outside by using a terminal 101, 102, 103, or 104.

In this case, the terminals cannot avoid the signal protective line patterns 3 and 4, and hence any one of the following situations occurs.

(1) The terminal is blocked from making illegal connection to the signal line pattern 2 by the signal protective line pattern 3 or the signal protective line pattern 4.

(2) The terminal cuts one of the signal protective line pattern 3 and the signal protective line pattern 4.

(3) The terminal cuts one of the signal protective line pattern 3 and the signal protective line pattern 4 and makes illegal connection to the signal line pattern 2.

(4) The terminal cuts one of the signal protective line pattern 3 and the signal protective line pattern 4 and makes illegal connection to the signal line pattern 2, and further cuts the opposite signal protective line pattern to bring the signal protective line patterns 3 and 4 into electrical contact with each other.

The respective cases are described below.

The case (1) is the state in which the illegal connection has failed, and corresponds to the terminal 101. In this state, the potentials of the signal protective line patterns 3 and 4 do not change normally.

The case (2) is the state corresponding to the terminal 102. When the signal protective line pattern 3 is cut, the potential thereof, which was close to 0 V before cut, changes to the potential applied via the first power source side resistive element 11.

When the signal protective line pattern 4 is cut, on the other hand, the potential thereof, which was close to the voltage of the power source 15 before cut, changes to the potential applied via the second ground side resistive element 14.

The case (3) is the state corresponding to the terminal 103. Due to the illegal connection, the potentials of the signal protective line patterns 3 and 4 change to the potential of the signal line pattern 2, that is, the potential close to the communication signal.

The case (4) is the state corresponding to the terminal 104. The potentials of the signal protective line patterns 3 and 4 change to the potential applied via the first ground side resistive element 13.

In any of the cases (2) to (4), when the detection section 21 detects the change in potential, the detection section 21 transmits the detected state to the illegal connection information generation section 23, and the illegal connection information generation section 23 generates illegal connection information and transmits the illegal connection information to the control unit of the information processing device that uses the FPC 1.

The control unit of the information processing device (not shown) that has received the illegal connection information stops the operation or erases important information based on the illegal connection information.

In this manner, it is possible to prevent the communication signal from being illegally read out, thus protecting important information.

Note that, in the above-mentioned first embodiment, the FPC control unit is provided separately from the control unit of the information processing device, but the FPC control unit may not be provided separately but may be provided as a part of the control unit of the information processing device.

As described above, according to the first embodiment, the FPC 1 includes the signal line pattern 2 for inputting the communication signal such as a bus signal or a data signal and the signal protective line patterns 3 and 4 provided to be opposed to the signal line pattern 2 and having the same width as that of the signal line pattern 2 or a larger width than that of the signal line pattern 2. The FPC control unit 10 is connected to the signal protective line patterns 3 and 4, and detects the change in potential of the signal protective line patterns 3 and 4 to monitor illegal connection. When illegal connection is attempted, the connection is physically hampered by the signal protective line patterns 3 and 4, or alternatively, the detection section 21 of the FPC control unit 10 detects the change in potential of the signal protective line patterns 3 and 4, and the illegal connection information generation section 23 generates the illegal connection information.

Consequently, it is possible to prevent the communication signal from being illegally read out, thus protecting important information.

Besides, according to the first embodiment, the signal protective line patterns 3 and 4 comprise the same wiring pattern as that of the signal line pattern 2, and hence the flexibility of the FPC 1 is not lost even when the signal protective line patterns 3 and 4 are arranged, and the cost is low.

Consequently, the FPC 1 comprises the structure capable of improving the tamper resistance at low cost while maintaining the structural characteristics.

Next, a second embodiment of this invention is described with reference to FIG. 8.

The second embodiment is a modification of the first embodiment, in which a dynamically changing voltage is applied to the signal protective line patterns 3 and 4 instead of the constant voltage.

Note that, in the second embodiment, elements serving the same functions as those in the first embodiment are denoted by the same reference numerals, and the different part from the first embodiment is mainly described below.

Figure 8:
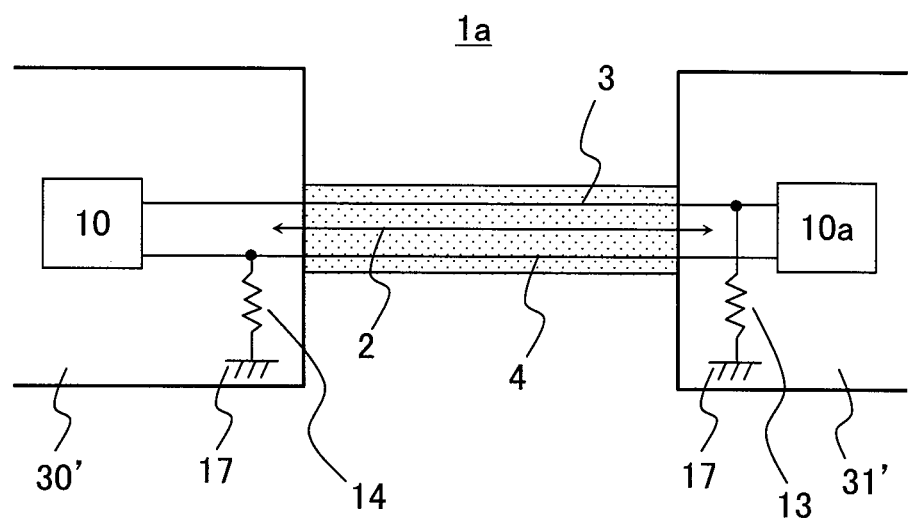

FIG. 8 illustrates an example where an FPC 1a is used to connect a first unit 30' and a second unit 31' to each other in an information processing device.

As illustrated in FIG. 8, in the FPC 1a, one end portion of each of the signal protective line patterns 3 and 4 is connected to an FPC control unit 10a instead of the power source 15.

In this configuration, the FPC control units 10 and 10a serve also as power sources to output a dynamically changing voltage waveform.

One of the FPC control units 10 and 10a to which the voltage waveform is input compares whether or not the voltage waveform is the same as that at the time of output. In this case, if illegal connection is attempted, the voltage waveform is not output as it is, but is detected as a different waveform from that at the time of output. Thus, the detection sections 21 (see FIG. 2) of the FPC control units 10 and 10a can detect the change in waveform as the change in potential.

As described above, the voltage to be applied to the signal protective line patterns 3 and 4 is not limited to a constant voltage, but may be a dynamically changing voltage.

Note that, in the above-mentioned second embodiment, the FPC control unit is provided separately from the control unit of the information processing device, but the FPC control unit may not be provided separately but may be provided as a part of the control unit of the information processing device.

As described above, according to the second embodiment, the FPC 1*a* includes the signal line pattern 2 for inputting the communication signal such as a bus signal or a data signal and the signal protective line patterns 3 and 4 provided to be opposed to the signal line pattern 2 and having the same width as that of the signal line pattern 2 or a larger width than that of the signal line pattern 2. The FPC control units 10 and 10*a* are connected to the signal protective line patterns 3 and 4, and detect the change in potential of the signal protective line patterns 3 and 4 to monitor illegal connection. When illegal connection is attempted, the connection is physically hampered by the signal protective line patterns 3 and 4, or alternatively, the detection sections 21 of the FPC control units 10 and 10*a* detect the change in potential of the signal protective line patterns 3 and 4, and the illegal connection information generation section 23 generates the illegal connection information.

Therefore, the second embodiment exhibits the same effects as those in the first embodiment.

Next, a third embodiment of this invention is described with reference to FIG. 9.

The third embodiment is a modification of the first embodiment, in which different potentials are applied to adjacent signal protective line patterns.

Note that, in the third embodiment, elements serving the same functions as those in the first embodiment are denoted by the same reference numerals, and the different part from the first embodiment is mainly described below.

Figure 9:
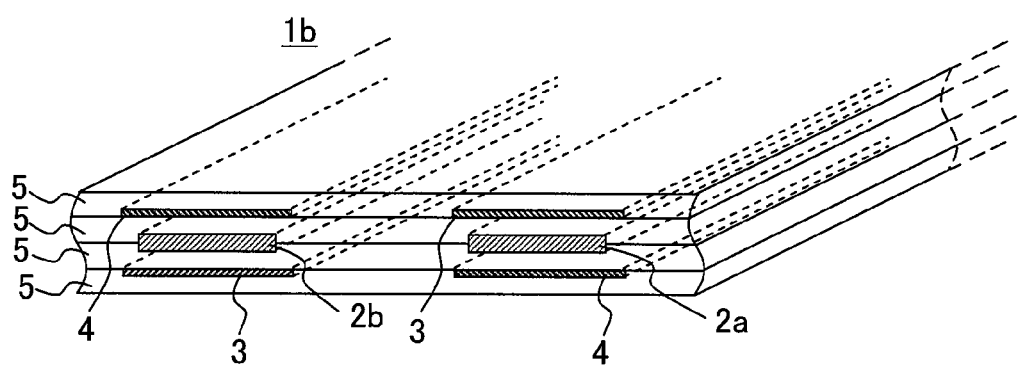
FIG. 9 is a cross-sectional perspective view illustrating a FPC 1b.

As illustrated in FIG. 9, in an FPC 1*b* according to the third embodiment, the signal protective line patterns 3 and 4 are provided to be opposed to both surfaces of each of adjacent signal line patterns 2*a* and 2*b*.

In this case, the signal protective line pattern 3 is provided on the upper surface side of the signal line pattern 2*a*, and the signal protective line pattern 4 is provided on the lower surface side thereof. On the other hand, the signal protective line pattern 4 is provided on the upper surface side of the signal line pattern 2*b*, and the signal protective line pattern 3 is provided on the lower surface side thereof.

In other words, the arrangements of the signal protective line patterns 3 and 4 are reverse between the adjacent signal line patterns 2*a* and 2*b*, and the FPC 1*b* is configured to apply different potentials to the adjacent signal protective line patterns.

By arranging the signal protective line patterns 3 and 4 in this manner, it is also possible to detect illegal contact between adjacent signal protective line patterns, thus further enhancing the degree of security.

As described above, according to the third embodiment, the FPC 1*b* includes the signal line patterns 2*a* and 2*b* for inputting the communication signal such as a bus signal or a data signal and the signal protective line patterns 3 and 4 provided to be opposed to the signal line patterns 2*a* and 2*b* and having the same width as that of the signal line patterns 2*a* and 2*b* or a larger width than that of the signal line patterns 2*a* and 2*b*. The FPC control unit 10 is connected to the signal protective line patterns 3 and 4, and detects the change in potential of the signal protective line patterns 3 and 4 to monitor illegal connection. When illegal connection is attempted, the connection is physically hampered by the signal protective line patterns 3 and 4, or alternatively, the detection section 21 of the FPC control unit 10 detects the change in potential of the signal protective line patterns 3 and 4, and the illegal connection information generation section 23 generates the illegal connection information.

Therefore, the third embodiment exhibits the same effects as those in the first embodiment.

According to the third embodiment, the FPC 1*b* is configured to apply different potentials to adjacent signal protective line patterns.

Consequently, the FPC 1*b* can also detect the contact between adjacent signal protective line patterns, thus further enhancing the degree of security as compared with the first embodiment.

Note that, in the above-mentioned third embodiment, the FPC control unit is provided separately from the control unit of the information processing device, but the FPC control unit may not be provided separately but may be provided as a part of the control unit of the information processing device.

Next, a fourth embodiment of this invention is described with reference to FIG. 10 and FIG. 11.

The fourth embodiment is an embodiment in which the FPC 1 according to the first embodiment is applied to an information processing device 100.

Note that, in the fourth embodiment, elements serving the same functions as those in the first embodiment are denoted by the same reference numerals, and the different part from the first embodiment is mainly described below.

Figure 10:
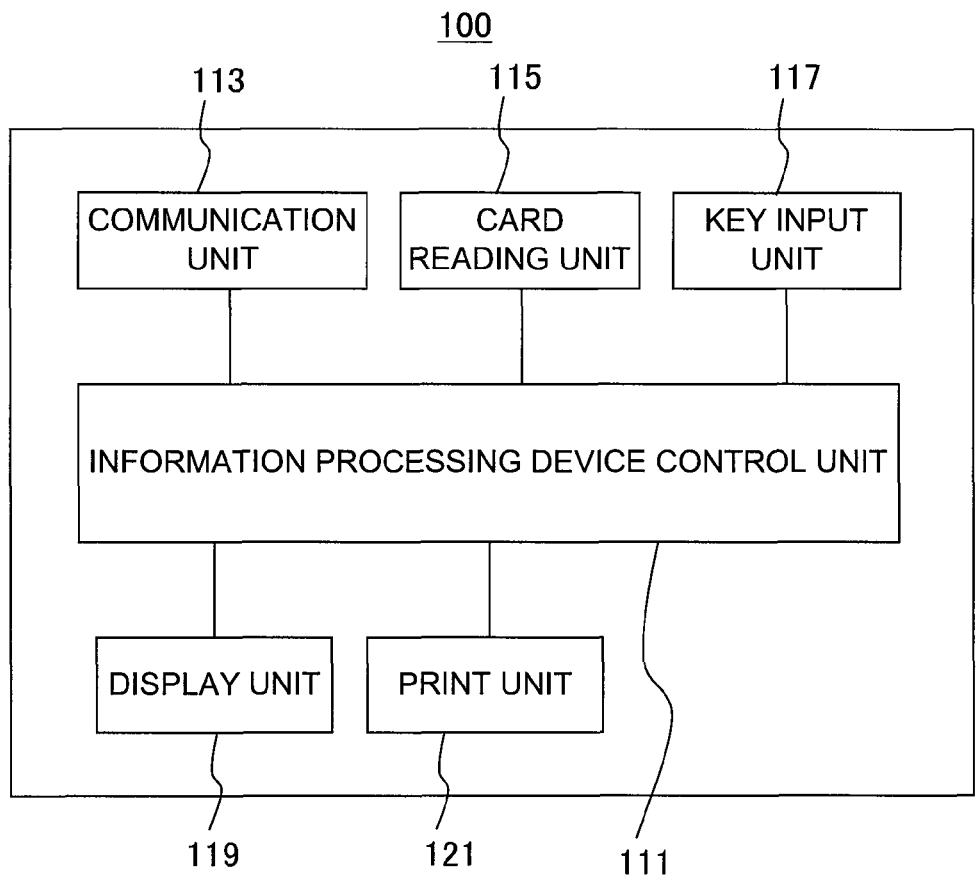
FIG. 10 is a block diagram illustrating a hardware configuration of an information processing device 100.

As illustrated in FIG. 10, the information processing device 100 according to the fourth embodiment is, for example, a credit card payment terminal, and includes a card reading unit 115 for reading a card such as a credit card, a key input unit 117 such as a numerical keypad for inputting a paid/received amount or a PIN number, a display unit 119 for displaying an operation screen, a print unit 121 for printing payment details, a communication unit 113 for communicating to/from the outside, and an information processing device control unit 111 connected those elements to control the operations of the elements.

Figure 11:
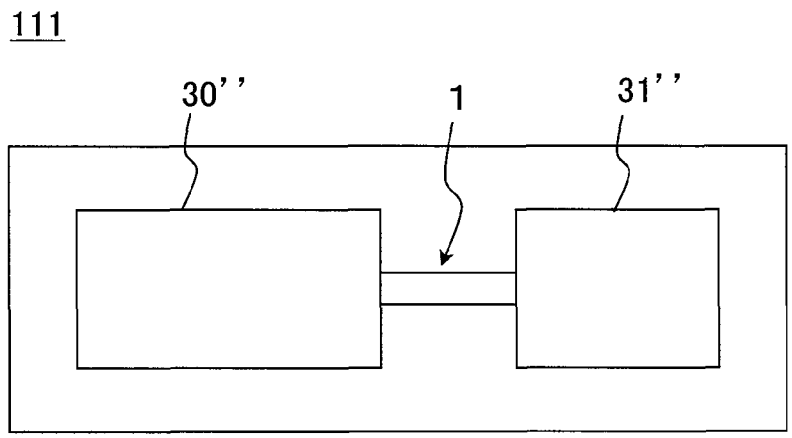
FIG. 11 is a block diagram illustrating an information processing device control unit 111 of FIG. 10.

As illustrated in FIG. 11, the information processing device control unit 111 includes a first unit 30" and a second unit 31", and the first unit 30" and the second unit 31" are connected to each other via the FPC 1. The FPC control unit 10 (not shown) is provided as a part of the information processing device control unit 111.

In this manner, the high-level security can be secured by using the FPC 1 for the connection of members of the information processing device 100, in particular, an information processing device such as a payment terminal for directly handling personal information, in particular, information on money or property.

Specifically, for example, when the FPC control unit 10 (see FIG. 2) of the FPC 1 detects external illegal connection, that is, detects the change in potential of the signal protective line patterns 3 and 4, the FPC control unit 10 of the FPC 1 generates and transmits illegal connection information to the information processing device control unit 111. The information processing device control unit 111 that has received the illegal connection information performs the processing of stopping the operation or the processing of erasing important information (such as customer information) owned by the information processing device 100.

Therefore, the fourth embodiment exhibits the same effects as those in the first embodiment.

Note that, in the above-mentioned fourth embodiment, the FPC control unit is provided as a part of the information processing device control unit, but the FPC control unit may be provided separately from the control unit of the information processing device.

In the above-mentioned first to fourth embodiments, the flexible printed cable includes the signal protective line patterns provided on the upper and lower surfaces of the signal line pattern in the region that requires tamper resistance and having the same width as that of the signal line pattern 2 or a larger width than that of the signal line pattern. However, if it is obvious that external illegal connection is attempted only from one side, the signal protective line pattern having the same width as that of the signal line pattern 2 or a larger width than that of the signal line pattern may be provided only on one of the upper and lower surfaces of the signal line pattern in the region that requires tamper resistance.

INDUSTRIAL APPLICABILITY

While the embodiments have been described for the case where this invention is applied to the information processing device 100, this invention is not intended to be limited thereto and is applicable to all types of electronic equipment that communicate with the use of a flexible printed cable.

In the above-mentioned embodiments, the signal protective line patterns are provided on both surfaces of the signal line pattern 2 and are each applied with the voltage. However, if it is obvious that external illegal connection is attempted only from one side, the opposite signal protective line pattern may be connected to the ground section.

Part or whole of the above-mentioned embodiments can also be described as in the following notes, but this invention is not limited thereto.

Supplementary Note 1

A flexible printed cable, including: a signal line pattern for inputting a communication signal; and signal protective line patterns provided to be opposed to an upper surface and a lower surface of the signal line pattern and having the same width as a width of the signal line pattern or a larger width than the width of the signal line pattern, in which the signal protective line patterns are provided along the signal line pattern within a region that requires tamper resistance.

Supplementary Note 2

An information processing device, including: the flexible printed cable according to Note 1; and a control unit including: a detection section for detecting a change in potential of the signal protective line patterns; and an illegal connection information generation section connected to the detection section, for generating illegal connection information for notifying that illegal connection has been made when the detection section detects the change in the potential.

Supplementary Note 3

An information processing device according to Supplementary Note 2, in which, when the illegal connection information is received, the information processing device performs processing of stopping an operation of a unit connected to the signal line pattern and/or processing of erasing important information owned by the information processing device.

Supplementary Note 4

An information processing device according to Supplementary Note 2 or 3, further including: a power source to be connected to the signal protective line patterns, for applying a voltage different from a voltage of the signal line pattern to the signal protective line patterns; a ground section to be connected to the signal protective line patterns, for grounding the signal protective line patterns; and a resistor section to be connected to the signal protective line patterns, for adjusting a potential of the signal protective line patterns.

Supplementary Note 5

An information processing device according to any one of Supplementary Notes 2 to 4, in which: the signal protective line patterns include: a first signal protective line pattern provided to be opposed to one surface of the signal line pattern; and a second signal protective line pattern provided to be opposed to another surface of the signal line pattern; and the first signal protective line pattern and the second signal protective line pattern are configured to have potentials different from each other.

Supplementary Note 6

An information processing device according to Supplementary Note 5, in which: the first signal protective line pattern is connected to the power source via a first power source side resistive element, and is connected to the ground section via a first ground side resistive element; and the second signal protective line pattern is connected to the power source via a second power source side resistive element, and is connected to the ground section via a second ground side resistive element.

Supplementary Note 7

An information processing device according to Supplementary Note 6, in which the first power source side resistive element, the second power source side resistive element, the first ground side resistive element, and the second ground side resistive element have electrical resistance values so that a potential of the first signal protective line pattern between the first power source side resistive element and the first ground side resistive element has a value closer to a potential of the ground section than a potential of the second signal protective line pattern between the second power source side resistive element and the second ground side resistive element.

Supplementary Note 8

An information processing device according to any one of Supplementary Notes 2 to 7, in which: a plurality of the signal line patterns are provided; and the power source applies different potentials to adjacent ones of the signal protective line patterns.

Supplementary Note 9

An information processing device according to Supplementary Note 8, in which the first signal protective line pattern and the second signal protective line pattern are arranged reversely between the adjacent ones of the signal protective line patterns.

Supplementary Note 10

An information processing device according to any one of Supplementary Notes 2 to 9, in which the power source is a power source for applying a constant voltage.

Supplementary Note 11

An information processing device according to any one of Supplementary Notes 2 to 9, in which the power source is a power source for applying a dynamically changing voltage.

Supplementary Note 12

An information processing device according to Supplementary Note 4, in which the second signal protective line pattern is connected to the ground section.

Supplementary Note 13

A flexible printed cable according to Supplementary Note 1, further including an insulating layer provided to separate the signal line pattern and the signal protective line patterns from one another and cover the signal line pattern and the signal protective line patterns.

Supplementary Note 14

A flexible printed cable, including: a signal line pattern for inputting a communication signal; and a signal protective line pattern provided to be opposed to only any one of an upper surface and a lower surface of the signal line pattern and having the same width as a width of the signal line pattern or a larger width than the width of the signal line pattern, in which the signal protective line pattern is provided along the signal line pattern within a region that requires tamper resistance.

This application claims priority from Japanese Patent Application No. 2011-150622, filed on Jul. 7, 2011, the entire disclosure of which is incorporated herein.

REFERENCE SIGNS LIST

1 FPC
1a FPC
1b FPC
2 signal line pattern
2a signal line pattern
2b signal line pattern
3 signal protective line pattern
4 signal protective line pattern
5 insulating layer
6 connector terminal
10 FPC control unit
10a FPC control unit
11 first power source side resistive element
12 second power source side resistive element
13 first ground side resistive element
14 second ground side resistive element
15 power source
17 ground section
21 detection section
23 illegal connection information generation section
24 communication line
30, 30', 30" first unit
31, 31', 31" second unit
100 information processing device
101 terminal
102 terminal
103 terminal
104 terminal
111 information processing device control unit
113 communication unit
115 card reading unit
117 key input unit
119 display unit
121 print unit

The invention claimed is:

1. A flexible printed cable, comprising:
a signal line pattern configured to transmit a communication signal;
an upper signal protective line pattern which is opposed to an upper surface of the signal line pattern and a lower signal protective line pattern which is separate from the upper signal protective line pattern and is opposed to a lower surface of the signal line pattern, wherein each of the upper signal protective line pattern and the lower signal protective line pattern has a width equal to or larger than a width of the signal line pattern,
wherein the signal protective line patterns are provided overlapping along the signal line pattern within a first region that requires tamper resistance,
wherein, in at least the first region of the cable, each portion of the signal line pattern is disposed between respective overlapping portions of the upper signal protective line pattern and the lower signal protective line pattern, and
wherein different potentials are applied to the upper signal protective line pattern and the lower signal protective line pattern; and
an insulating layer separating the signal line pattern, the upper signal protective line pattern, and the lower signal protective line pattern from one another and covering the signal line pattern, the upper signal protective line pattern, and the lower signal protective line pattern.

2. An information processing device, comprising:
the flexible printed cable according to claim 1; and
a control unit comprising:
a detector which detects a change in potential of the signal protective line patterns; and
an illegal connection information generator connected to the detector, which generates illegal connection information for notifying that illegal connection has been made when the detector detects the change in the potential.

3. The information processing device according to claim 2, wherein, when the illegal connection information is received, the information processing device performs processing of stopping an operation of a unit connected to the signal line pattern and/or processing of erasing important information owned by the information processing device.

4. The information processing device according to claim 2, further comprising:
at least one power source connected to the upper signal protective line pattern and the lower signal protective line pattern via a first resistive section, and configured to apply a voltage, different from a voltage of the signal line pattern, to the upper signal protective line pattern and the lower signal protective line pattern;
a ground section, connected to the upper signal protective line pattern and the lower signal protective line pattern via a second resistive section, which grounds the signal protective line patterns.

5. The information processing device according to claim 4, wherein:
the upper signal protective line pattern and the lower signal protective line pattern are configured to have different potentials.

6. The information processing device according to claim 5, wherein:

the upper signal protective line pattern is connected to the power source via a first power source side resistive element of the first resistive section, and is connected to the ground section via a first ground side resistive element of the second resistive section;

the lower signal protective line pattern is connected to the power source via a second power source side resistive element of the first resistive section, and is connected to the ground section via a second ground side resistive element of the second resistive section; and the first power source side resistive element, the second power source side resistive element, the first ground side resistive element, and the second ground side resistive element have electrical resistance values so that a potential of the upper signal protective line pattern between the first power source side resistive element and the first ground side resistive element has a value closer to a potential of the ground section than a potential of the lower signal protective line pattern between the second power source side resistive element and the second ground side resistive element.

7. The information processing device according to claim 2, wherein:
   a plurality of the signal line patterns are provided; and
   said information processing device is configured so that different potentials are applied to adjacent ones of the signal protective line patterns.

8. The information processing device according to claim 4, wherein the power source comprises a power source for applying a constant voltage or a dynamically changing voltage.

9. A flexible printed cable, comprising:
   a signal line pattern configured to transmit a communication signal;
   a signal protective line pattern which is opposed to only any one of an upper surface and a lower surface of the signal line pattern, wherein the signal protective line pattern has a width equal to or larger than a width of the signal line pattern,
      wherein the signal protective line pattern is provided overlapping along the signal line pattern within a first region that requires tamper resistance, and
      wherein, in at least the first region of the cable, each portion of the signal line pattern is disposed between an overlapping portion of the signal protective line pattern and the other of the upper surface and the lower surface of the signal line pattern; and
   an insulating layer separating the signal line pattern and the signal protective line pattern from one another and covering the signal line pattern and the signal protective line pattern.

10. An information processing device, comprising:
    the flexible printed cable according to claim 9; and
    a control unit comprising:
    a detector which detects a change in potential of the signal protective line pattern; and
    an illegal connection information generator connected to the detector, which generates illegal connection information for notifying that illegal connection has been made when the detector detects the change in the potential.

* * * * *